Patented Jan. 24, 1950

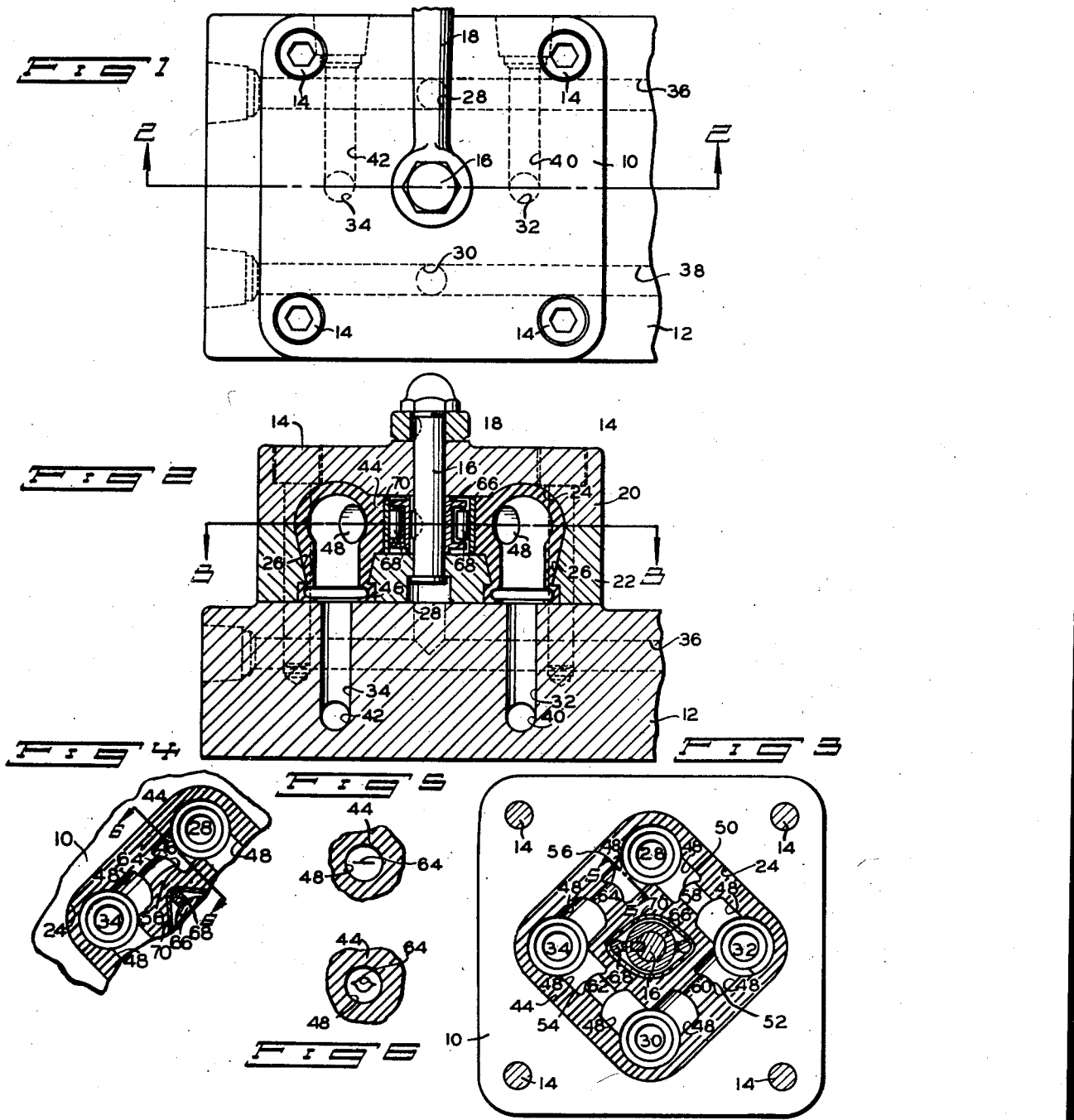

2,495,395

UNITED STATES PATENT OFFICE 2,495,395

POWER TRANSMISSION VALVE

Ralph L. Tweedale, Birmingham, Mich., assignor to Vickers Incorporated, Detroit, Mich., a corporation of Michigan Application May 11, 1946, Serial No. 669,151

8 Claims. (Cl. 277—60)

This invention relates to power transmissions, particularly to those of the type comprising two or more fluid pressure energy translating devices, one of which may function as a pump and another as a fluid motor.

The invention is more particularly concerned with valves adapted for use in power transmission systems of this character as well as for general application to all types where single or multiwave valves are used.

There is disclosed in the copending applications of L. Raymond Twyman, Serial No. 669,158 and Serial No. 669,159 filed May 11, 1946, a valve in which a single member formed of rubber or material having similar flexible characteristics may be flexed in certain ways to open and close a passage through the wall thereof. The valve there disclosed avoids the use of constructions having two or more relatively movable rigid parts at the point where fluid flow is actually controlled and eliminates the necessity of having packings, flexible diaphragms, etc., for enabling relative movement of the two parts to take place from a point outside the fluid passages of the valve.

It is an object of the present invention to provide an improved valve construction incorporating such principle and which is particularly adapted for use as a four-way selector valve in fluid power transmission systems as well as for other uses.

A further object of the present invention is to provide a valve of this character in which fluid under very high pressure may be safely used, and in which the necessity for sliding or rotating seals is entirely eliminated.

Further objects and advantages of the present invention will be apparent from the following description, reference being had to the accompanying drawing wherein a preferred form of the present invention is clearly shown.

In the drawing:

Figure 1 is a top view of a valve incorporating a preferred form of the present invention.

Figure 2 is a longitudinal sectional view taken on line 2—2 of Figure 1.

Figure 3 is a transverse sectional view taken on line 3—3 of Figure 2.

Figure 4 is a fragmentary view corresponding to a portion of Figure 3 showing the parts in a different position.

Figure 5 is a fragmentary sectional view on line 5—5 of Figure 3 showing one of the valve elements in closed position.

Figure 6 is a fragmentary sectional view on line 6—6 of Figure 4 showing the same valve element in open position.

Referring now to Figure 1 there is shown a main four-way valve body 10 secured to a manifold plate 12 by a plurality of bolts 14. The body 10 is substantially square and is provided with an operating stem 16 projecting from the center thereof and provided with an oscillatable handle 18. The body 10 is formed of two halves 20 and 22 above and below the section line 3—3 on Figure 2. These halves are hollowed to provide a generally rectangular cavity 24 from which downwardly directed openings 26 extend to the lower surface of the body 10 adjacent the four corners of the cavity 24.

These openings 26 are in line with a plurality of ports 28, 30, 32 and 34 formed in the manifold plate 12. Port 28 communicates with a longitudinal pressure passage 36 while port 30 communicates with a longitudinal return passage 38. Ports 32 and 34 communicate with transverse service passages 40 and 42 respectively leading to the upper surface of manifold 12 in Figure 1.

The cavity 24 and openings 26 contain a one-piece flexible valve body 44 shaped to fit this cavity and formed of rubber or similar flexible material. The portions of the body 44 which extend to the openings 26 are provided at their lower ends with integral sealing portions 46 adapted to seal the joint between body 10 and manifold 12 in a manner similar to that disclosed in the Martin patent, 2,204,507. The valve body 44 is hollowed to provide four lateral passages 48 connecting adjacent corner spaces of the body and each of these passages is provided with a transverse wall 50, 52, 54, and 56, respectively, each of which is formed with a slit 58, 60, 62 and 64. The walls of these slits normally are in contact with each other and the contours of the transverse walls are concave and convex as illustrated. By providing these walls with substantial thickness and relatively great convexity, it will be seen that the application of pressure on the convex side tends to wedge the sides of each slit more tightly into contact with one another thus sealing the slit against passage of pressure fluid from the convex to the concave side of the wall.

For the purpose of controlling the opening and closing of the various slits, the stem 16 is provided with a roller assembly 66 having a pair of small rollers 68 secured at diametrically opposite points thereon. The body member 44 is provided with a central cylindrical cavity having a very thin and flexible metallic liner 70 preferably vulcanized thereto; the thickness of the liner 70 is shown exaggerated in the drawing for purposes of clarity. The periphery of the liner 70 is of such dimension as to encompass the two rollers 68 only when it is distorted to a somewhat elliptical shape as seen in Figure 3.

In operation with the parts in the position shown in Figures 1 through 3 and 5, the valve is in neutral position and the slits 58 and 64 are tightly closed by the action of fluid pressure from port 28 which acts across the convex face of walls 50 and 56. This action wedges the two side walls of the slits 58 and 64 into tight contact and effectively seals the port 28 against leakage of pressure fluid.

When the handle 18 is rotated 45 degrees clockwise in Figure 1, the rollers 68 will occupy the position as shown in Figure 4 directly adjacent the transverse walls 52 and 56. This will compress these walls laterally causing them to become more convex than normal and will separate the side walls of the slit to form an opening substantially as shown in Figure 6. This permits the passage of pressure fluid from port 28 to service port 34 and also connects the service port 32 with the return port 30. The walls 50 and 54 have their convex faces subject to pressure from port 28 and accordingly slits 58 and 62 are tightly sealed.

It will be clear also that when the handle 18 is rotated 45 degrees counterclockwise from the position shown in Figure 1, a similar action will take place except that slits 58 and 62 will be opened and slits 60 and 64 will be closed by fluid pressure from port 28.

While the form of embodiment of the invention as herein disclosed constitutes a preferred form, it is to be understood that other forms might be adopted, all coming within the scope of the claims which follow. Claims to the construction of a single, pressure-closed, and mechanically-opened valve for controlling a single passage are not the subject of the present invention but are included in the copending applications heretofore referred to.

What is claimed is as follows:

1. A multi-way valve for controlling fluid flow under pressure comprising a hollow member formed of a material having the flexible characteristics of rubber, means for admitting fluid under pressure to the interior of said member, a plurality of slitted walls formed in the hollow member, the shape of each slitted wall being such that the stresses induced by fluid pressure tend to close the slit, and mechanical operating means for positively flexing the member to open the slits selectively in opposition to the fluid pressure.

2. A multi-way valve for controlling fluid flow under pressure comprising a hollow member having a plurality of wall portions formed of a material having the flexible characteristics of rubber, each wall portion having a slit and shaped to provide a wedging action tending to close the slit when the wall is flexed laterally in one direction by fluid pressure, and means for flexing the walls selectively in opposition to fluid pressure whereby to selectively open each slit.

3. A multi-way valve for controlling fluid flow under pressure comprising a hollow member having a plurality of wall portions formed of a material having the flexible characteristics of rubber, each wall portion having a slit and presenting a substantially convex surface on the pressure side of the wall, means confining the application of inlet pressure fluid to the pressure side of each wall, said slit being self-closing under the application of inlet pressure, and means for compressing said walls selectively to open the respective slit.

4. A multi-way valve for controlling fluid flow under pressure comprising in combination, a rigid body provided with a cavity, a one-piece liner for the cavity having port openings extending to the exterior of the body, the liner being formed of a material having the flexible characteristics of rubber, means associated with the liner for normally blocking communication between said ports and comprising a plurality of wall members having similar flexible characteristics and each having a slit and shaped to provide a wedging action tending to close the slit when fluid pressure is applied to one side of the wall, and means for alternately flexing the walls in opposition to fluid pressure to selectively open one or the other slit.

5. A multi-way valve for controlling fluid flow under pressure comprising in combination, a rigid body provided with a cavity, a one-piece liner for the cavity having port openings extending to the exterior of the body, the liner being formed of a material having the flexible characteristics of rubber, means associated with the liner for normally blocking communication between said ports and comprising a plurality of wall members having similar flexible characteristics and each having a slit and shaped to provide a wedging action tending to close the slit when fluid pressure is applied to one side of the wall, means for alternately flexing the walls in opposition to fluid pressure to selectively open one or the other slit, and means formed integrally with the liner for sealing the end of each port when assembled in juxtaposition to a member having a registering conduit therein.

6. A multi-way valve for controlling fluid flow under pressure comprising in combination, a rigid body provided with a cavity, a one-piece liner for the cavity having port openings extending to the exterior of the body, the liner being formed of a material having the flexible characteristics of rubber, means associated with the liner for normally blocking communication between said ports and comprising a plurality of wall members having similar flexible characteristics and each having a slit and shaped to provide a wedging action tending to close the slit when fluid pressure is applied to one side of the wall, means for alternately flexing the walls in opposition to fluid pressure to selectively open one or the other slit, and means forming a pressure-actuated sealing lip surrounding each port at the exterior of the body.

7. A multi-way valve for controlling fluid flow under pressure comprising in combination, a rigid body provided with a cavity, a one-piece liner for the cavity having port openings extending to the exterior of the body and providing an impervious walled chamber connecting only with said ports, the liner being formed of a material having the flexible characteristics of rubber, means formed integrally with the liner for selectively blocking or opening communication through the chamber between each adjacent pair of ports, and means for operating said last named means.

8. A multi-way valve for controlling fluid flow under pressure comprising in combination, a rigid body provided with a cavity, a one-piece liner for the cavity having port openings extending to the exterior of the body and providing an impervious walled chamber connecting only with said ports, the liner being formed of a material having the flexible characteristics of rubber, and means formed integrally with the liner for selectively blocking or opening communication through the chamber between each adjacent pair of ports, said last means being self-sealing under the application of a pressure difference in one direction between ports when in blocking condition and positively movable to open condition in opposition to such pressure difference.

RALPH L. TWEEDALE.

REFERENCES CITED

The following references are of record in the file of this patent:

UNITED STATES PATENTS

| Number | Name | Date |
|---|---|---|
| 274,447 | Kennish | Mar. 20, 1883 |
| 703,101 | Ware | June 24, 1902 |